United States Patent
Baker (10) Patent No.: US 10,738,432 B2
(45) Date of Patent: Aug. 11, 2020

(54) CONTINUOUS MONITORING SYSTEM OF LEG POSITION AND LOADING FOR A DRILLING RIG

(71) Applicant: TECAT Performance Systems, LLC, Ann Arbor, MI (US)

(72) Inventor: Douglas Martin Baker, Ypsilanti, MI (US)

( * ) Notice: Subject to any disclaimer, the term of this patent is extended or adjusted under 35 U.S.C. 154(b) by 0 days.

(21) Appl. No.: 15/705,177

(22) Filed: Sep. 14, 2017

(65) Prior Publication Data

US 2018/0073210 A1    Mar. 15, 2018

Related U.S. Application Data

(60) Provisional application No. 62/394,272, filed on Sep. 14, 2016.

(51) Int. Cl.
| | |
|---|---|
| E02B 17/00 | (2006.01) |
| E21B 15/02 | (2006.01) |
| H04Q 9/00 | (2006.01) |
| E02B 17/08 | (2006.01) |
| E02B 17/02 | (2006.01) |

(52) U.S. Cl.
CPC ........ *E02B 17/0034* (2013.01); *E02B 17/021* (2013.01); *E02B 17/0818* (2013.01); *E21B 15/02* (2013.01); *H04Q 9/00* (2013.01); *E02B 17/08* (2013.01); *E02B 2017/006* (2013.01); *E02B 2017/0056* (2013.01); *H04Q 2209/40* (2013.01); *H04Q 2209/823* (2013.01)

(58) Field of Classification Search
CPC .... E02B 17/0034; E02B 17/08; E21B 15/002; H04Q 9/00; H04Q 2209/40
See application file for complete search history.

(56) References Cited

U.S. PATENT DOCUMENTS

| | | | | |
|---|---|---|---|---|
| 2002/0171560 | A1* | 11/2002 | Ciglenec | E21B 7/061 340/853.1 |
| 2007/0107937 | A1* | 5/2007 | Sugiura | E21B 7/062 175/45 |
| 2012/0050056 | A1* | 3/2012 | Lenders | G01L 3/02 340/665 |
| 2013/0161097 | A1* | 6/2013 | Benson | E21B 7/04 175/26 |
| 2015/0188599 | A1* | 7/2015 | Shi | H04L 1/18 455/78 |
| 2017/0130575 | A1* | 5/2017 | Jaffrey | E21B 33/06 |
| 2018/0044872 | A1* | 2/2018 | Deul | E02B 17/0836 |

* cited by examiner

*Primary Examiner* — Amine Benlagsir
(74) *Attorney, Agent, or Firm* — Dickinson Wright, PLLC (57) ABSTRACT

The present invention generally relates to a continuous monitoring system and method for monitoring the loads in a support leg of an offshore drilling rig through a remote unit mounted to the climbing pinion shaft of a jacking drive system when the brake is engaged.

17 Claims, 6 Drawing Sheets

CONTINUOUS MONITORING SYSTEM OF LEG POSITION AND LOADING FOR A DRILLING RIG

CROSS REFERENCE TO RELATED APPLICATION

This U.S. Utility Application claims the benefit of U.S. Provisional Application Ser. No. 62/394,272 filed Sep. 14, 2016, which is incorporated herein by reference in its entirety.

FIELD OF DISCLOSURE

The present disclosure generally relates to a wireless continuous monitoring system mounted to a jacking drive system of an offshore drilling rig and a method for measuring the load on the support legs of an offshore drilling rig for the purposes of equally distributing the load across all legs of the rig and alerting an operator when the load on any leg is outside of a pre-specified range.

BACKGROUND OF THE DISCLOSURE

In general, offshore drilling rigs are used to extract and process oil and natural gas. An offshore drilling rig typically consists of a platform supported by one or more legs that engage the sea floor. When first installed, the platform is typically towed to the installation location with the platform legs fully raised up. Once the rig is in location, the supporting legs are lowered to the sea floor by an elevating unit. The supporting legs are then further extended by the elevating unit to raise the platform above the surface of the water for operation, so as to minimize the effects of the surface conditions on the platform itself.

Typically, there is an elevating unit on each corner, or 'chord', of each leg. Each elevating unit consists of multiple drivetrains housed in a structure attached to a hull of the platform. The elevating unit drivetrains are powered by vertically stacked gear motors during raising operations. The gear motors act as electrical brakes during lowering operations with generated energy dissipated in a resistor bank. The loads of each leg of the rig are measured from the current passing through the motors. The elevating unit and jacking legs operate as a rack and pinion style system. Once the monitored current indicates that the load is equally distributed amongst the legs, the gear motors are disabled and gear motor brakes are engaged to hold the static loads transmitted through the rack and pinion system. At this point, the load can no longer be monitored through the gear motor current.

The loads distributed through the various drivetrains and passing through to the gear motor brakes can become imbalanced as a result of variations in motor and brake performance during jacking operations, and due to external load factors such as hull loading, drilling, wave interactions and sea bed movement. In order to extend the life and wear characteristics of the drivetrain and gear motor components within the jacking system, and to minimize any safety concerns, the static loads passing through each drivetrain and gear motor are typically balanced at regular intervals (e.g., monthly).

In the past, leg load balancing has been performed manually at regular intervals. However, because of the unpredictability of the forces acting on the legs, one or more of the drivetrains within a leg could become highly overloaded during a regular interval. As a result, the rig could potentially be damaged. In addition, if one or more of the elevating units within a leg becomes significantly overloaded, there may be a large sudden impact load applied to motors within the elevating unit when the brake is released, which could damage the motor and associated geartrain.

Due to this potential imbalanced loading of the legs, chords and motors, methods and systems for monitoring the load in each leg were established. In one example, strain gauges are mounted to multiple shafts of the gearbox of the jacking drive system. These strain gauges are wired through holes that pass through the inside of the shafts, and extend to the shaft end, where a slip ring is mounted to provide power to the strain gauges and to log the measured data.

There are several shortcomings and downfalls to this type of system. Slip rings are heavy and the shaft must be altered to mount the slip ring properly. The shaft also requires alterations to allow wires to pass through the center of the shaft to connect the strain gauges to a location where the slip ring can be mounted. Further, junction boxes, signal conditioning and additional support hardware take up space, and require a plurality of wires to connect the system, all of which can be prone to breaking, or coming loose under vibrations.

Thus, there is a need for a wireless continuous monitoring system and method to monitor the load in each leg of an offshore drilling rig when the brake is engaged.

SUMMARY AND ADVANTAGES OF THE DISCLOSURE

The aspects of the present disclosure provide for a continuous monitoring system and method for monitoring loads in offshore platform leg supports. In particular, the wireless system is capable of continuously monitoring loads within the elevating units of each chord of the support legs even when a brake is applied between the motor and the gearbox of each jacking drive system.

An aspect of the continuous monitoring system may include a remote unit with one or more sensors for measuring strain, which can be converted into load on the drilling platform support leg. The continuous monitoring system may also be configured to wirelessly transmit the operational data to a data acquisition system using radio frequency (RF) transmission for real-time and/or future analysis. The operational data may include, but is not limited to, mechanical strain, thermal strain, torsional load, change in motion, temperature, any combination thereof, and the like.

Another aspect of the continuous monitoring system may include a mounting assembly with a sealed enclosure which houses and protects the remote unit and which can be mounted to the climbing pinion shaft. The continuous monitoring system also may include a receiving 'base' system located at an access hole in the housing that surrounds the climbing pinion shaft. The access hole may also be used to provide a manner for recharging the power source on the sealed enclosure when needed. The receiving data can be displayed for an operator to monitor continuously, the data can be stored in a database for ongoing data analysis, and algorithms can be used to display alerts and alarms to indicate if the leg load has exceeded certain thresholds, such as, but not limited to, a maximum allowable load, or a sudden increase or decrease in load.

The aspects of the present disclosure provide various advantages. For instance, the system and method allow for continuous monitoring and display of load distribution across the drilling rig by an operator. Additionally, the system and method allow for an alert system in the event load distribution across the legs of the rig becomes uneven due to environmental forces, when the brake is applied. Additionally, as a wireless system, the system and method are more robust and easier to install than the methods of prior art.

BRIEF DESCRIPTION OF THE DRAWINGS

Other aspects of the present disclosure will become better understood by reference to the following description when considered in connection with the accompanying drawings wherein.

DETAILED DESCRIPTION OF THE PRESENT DISCLOSURE

Detailed aspects of the present disclosure are provided herein; however, it is to be understood that the disclosed aspects are merely exemplary and may be embodied in various and alternative forms. It is not intended that these aspects illustrate and describe all possible forms of the disclosure. Rather, the words used in the specification are words of description rather than limitation, and it is understood that various changes may be made without departing from the spirit and scope of the disclosure. As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations. Additionally, the features and various implementing embodiments may be combined to form further examples of the disclosure.

Figure 1:
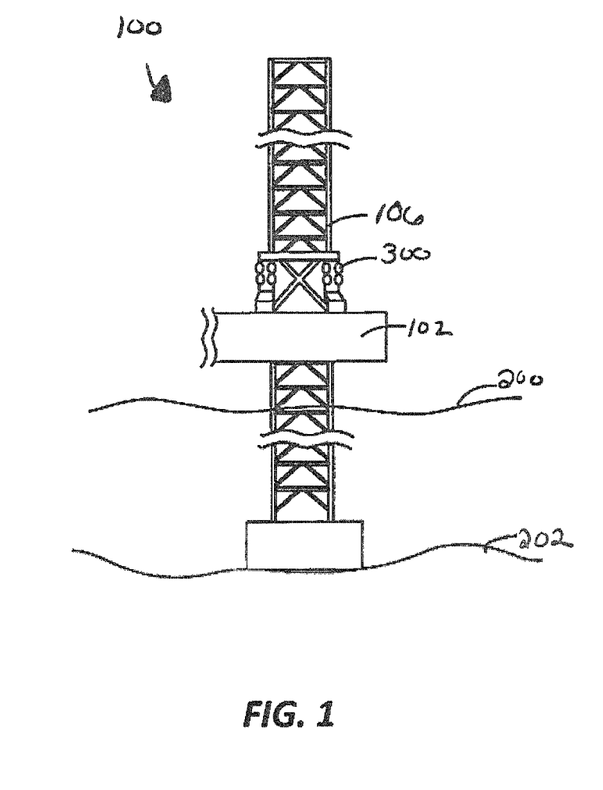
FIG. 1 is an illustration of an example of a drilling rig with a platform, a pumping drive system, and support legs.

FIG. 1 is an illustration of an example of an offshore drilling rig 100 with a platform 102 and one or more support legs 106. While the offshore drilling rig 100 is being towed into place, the legs 106 are fully retracted. Once the drilling rig 100 is positioned in the desired location and is floating on the surface of the water 200, the one or more legs 106 are extended down to the seafloor 202 by a one or more jacking drive systems 300, each having a rack and pinion type configuration. The legs 106 are extended enough to raise the platform 102 above the surface of the water 200.

Figure 2:
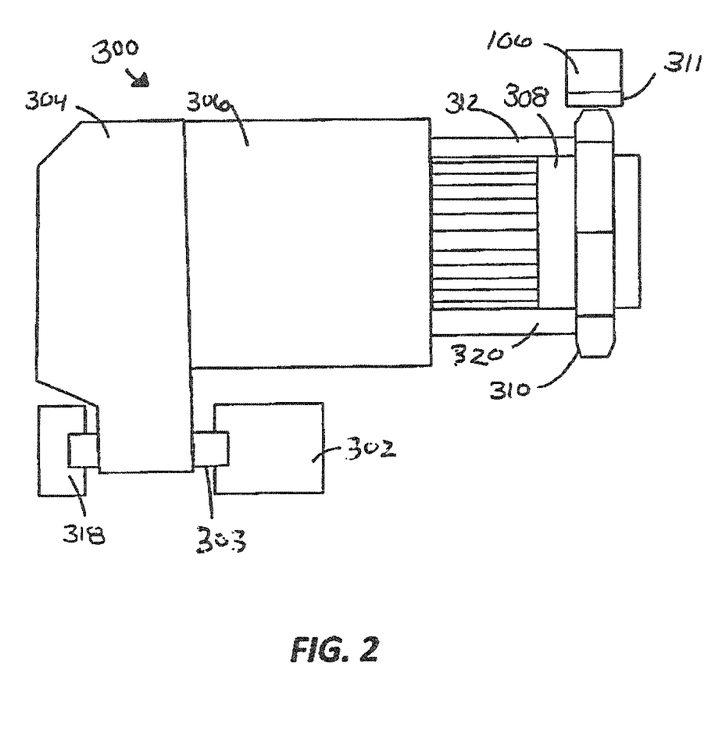
FIG. 2 is a top view of an example of a jacking drive system commonly used on drilling rig platforms to raise and lower the platform legs.
Figure 3:
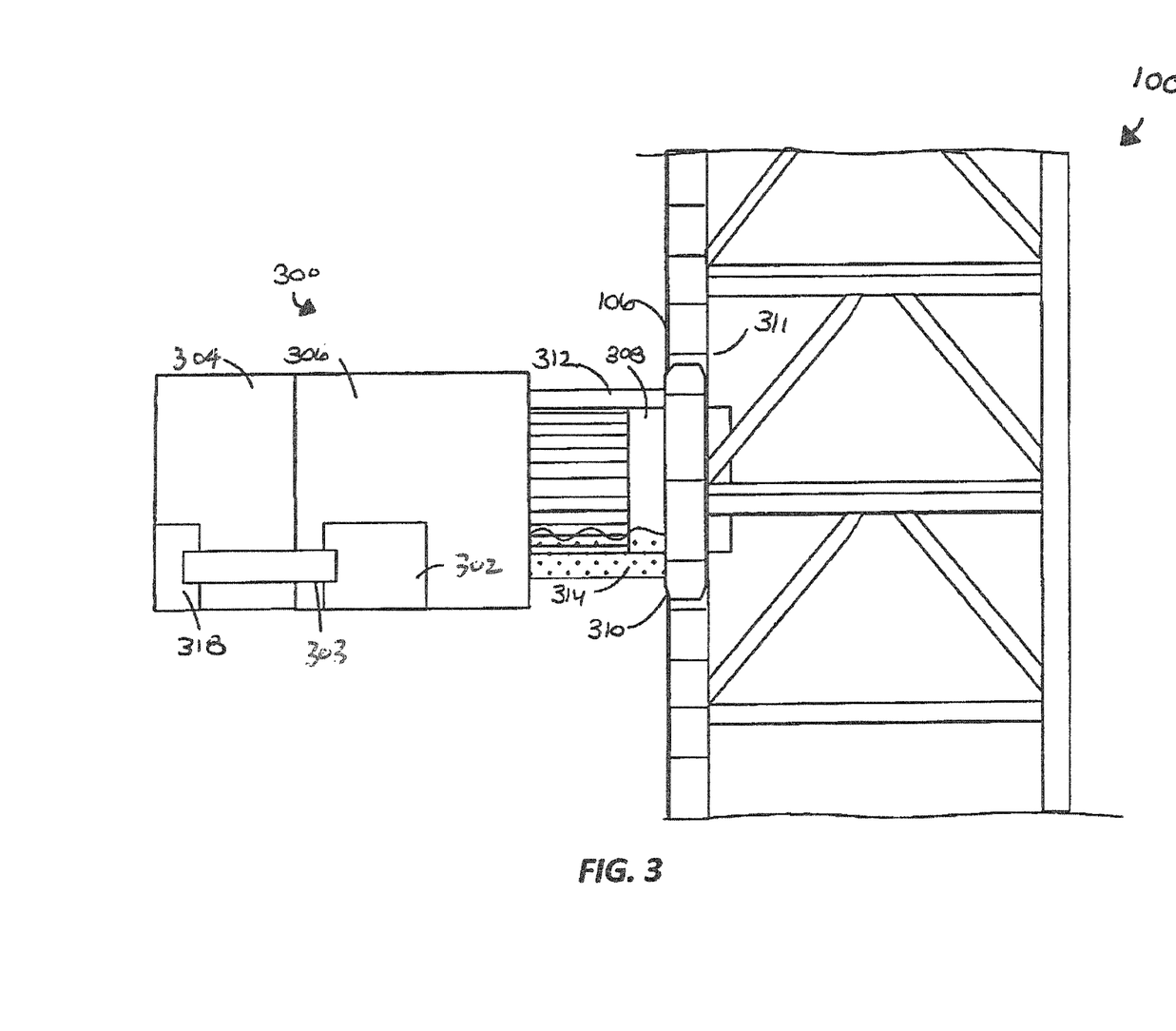
FIG. 3 is a side view of an example of a jacking drive system commonly used on drilling rig platforms to raise and lower the platform legs.

FIG. 2. is a top view and FIG. 3 is a side view of an example of a jacking drive system 300 used in an offshore drilling rig 100. A motor 302 turns an output shaft 303, which is connected to a helical gearbox 304. The helical gearbox 304 then connects to a planetary gearbox 306. The planetary gearbox 306 turns the climbing pinion shaft 308, which is connected to the climbing pinion 310. When in operation, the climbing pinion 310 either raises or lowers the rack 311 which is welded to the leg 106. The climbing pinion shaft 308 is enclosed in a housing 312 which is partially filled with oil 314. When the motor 302 spins in one direction, the leg 106 is extended closer to the sea floor 202, and when the direction of the motor 302 is reversed, the legs 106 move in an upward direction. When all legs of the structure have been positioned on the seafloor 202, the load is evenly distributed across all legs of the structure by ensuring that the loads of all motors 302 are equal. One skilled in the art can appreciate that this is measured through the current of the motors 302. A brake 318 is then applied, to remove the load from the motor 302 so as to minimize motor wear. The brake 318 may be of any type that will hold the climbing pinion shaft 308 in place. However, once the brake 318 is engaged, the motor 302 is no longer exposed to the load in the leg 106 and therefore, the load in the leg 106 can no longer be measured from the current in the motor 302.

Figure 4:
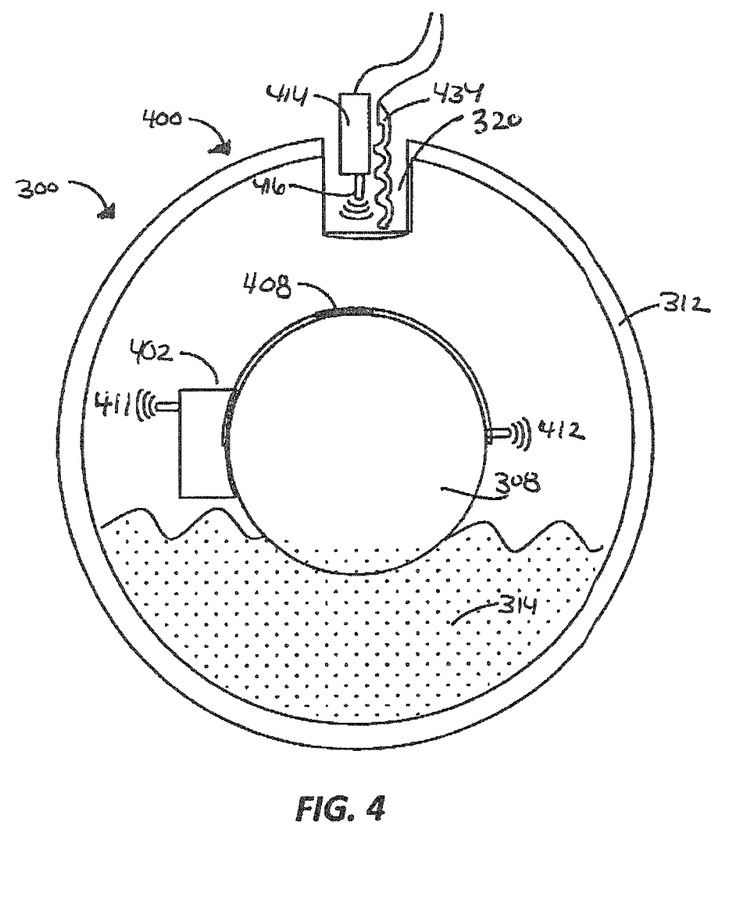
FIG. 4 is a cross-sectional view of an example of a climbing pinion shaft and housing for a jacking drive system with a continuous monitoring system mounted to the shaft in accordance with an aspect of the present disclosure.
Figure 5:
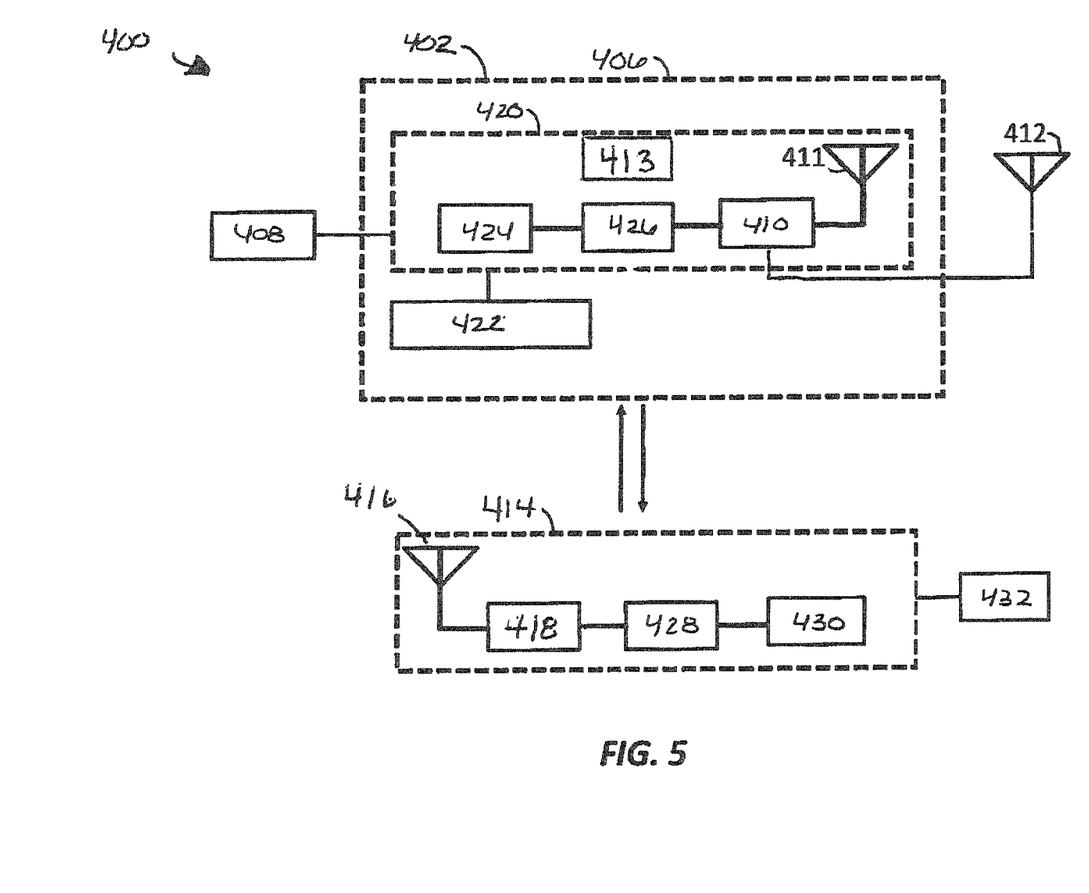
FIG. 5 is a block diagram of the continuous monitoring system architecture for measuring operational data of a climbing pinion shaft in accordance with an aspect of the present disclosure.

FIG. 4 is a cross-sectional view of a climbing pinion shaft 308 and housing 312 for a jacking drive system 300 with a continuous monitoring system 400 mounted to the climbing pinion shaft 308 in accordance with an aspect of the present disclosure. The climbing pinion shaft 308 is enclosed in the housing 312, which is partially filled with oil 314. The continuous monitoring system 400 may include a remote unit 402 which is mounted to the climbing pinion shaft 308 and a base unit 414 which is inserted in an access port 320 in the housing 312. The remote unit 402 has a sealed enclosure 406 for housing and protecting the electronics of the remote unit 402. In one aspect of the present disclosure, the sealed enclosure 406 may be connected to one or more sensors 408 which measure operational data of a climbing pinion shaft 308. The remote unit 402 may include a transceiver 410 (FIG. 5) coupled to a primary antenna 411. The transceiver 410 may also be connected to a secondary antenna 412 which may be mounted to the climbing pinion shaft 308 at a location 180 degrees opposite the remote unit 402. The dual-antenna configuration is used to ensure that, at any point during the rotation of the climbing pinion shaft 308, at least one antenna, either the primary antenna 411 or the secondary antenna 412, will not be under the surface of the oil 314, and will therefore be capable of transmitting the data to the base unit 414, regardless of rotational position of the climbing pinion shaft 308. The appropriate component to use may be incorporated into the strategy of the remote unit 402 with a switching mechanism 413 (FIG. 5). The base unit 414 can include an antenna 416 coupled to a transceiver 418, which may be in wireless communication with the remote unit 402 via RF transmission. Specifically, the remote unit 402 may transmit operating conditions or operational data of the climbing pinion shaft 308 from the sensors 408 to the base unit 414.

In one aspect of the present disclosure, the sensors 408 may be strain gauges, measuring strain on the climbing pinion shaft 308. The remote unit 402 may be configured to convert the measured strain into torque values.

FIG. 5 is a block diagram of the continuous monitoring system 400 architecture for measuring operational data of the climbing pinion shaft 308 in accordance with an aspect of the present disclosure. In particular, FIG. 5 shows the remote unit 402 connected to one or more sensors 408 and is in wireless communication with a base unit 414. As discussed above, the remote unit 402 includes the sealed enclosure 406. The sealed enclosure 406 houses a circuit board 420 and a power storage device 422. The circuit board 420 distributes power to the one or more sensors 408 and may have a microprocessor 424, an A/D converter 426, the transceiver 410, the primary antenna 411, the secondary antenna 412 and the switching mechanism 413 disposed thereon. As discussed above, the base unit 414 has the antenna 416 and transceiver 418. The base unit 414 can also include a microprocessor 428, and in one aspect of the present disclosure, an onboard storage device 430.

In another aspect of the present disclosure, data from base units 414 for each jacking drive system 300 on the support leg 106 are combined in real-time such that the total force on each support leg 106 of the rig 100 is determined. The measured force on the support leg 106 is continuously compared to the allowable load range and is connected to an alert system 432 (FIG. 5) with visual and/or audible alarms to alert an operator that the load is outside of a pre-specified range. In one aspect of the present disclosure, loads for all support legs 106 are compared to ensure the load distribution is also within a pre-specified range.

In another aspect of the disclosure, the remote unit 402 transmits the state of charge of the power storage device 422 to the base unit 414. When the base unit 414 detects that the state of charge on the power storage device 422 in the remote unit 402 is low, a power probe 434 is lowered into the access port 320 of the housing 312. In one aspect of the present disclosure, the power probe 434 is an inductive power coil. The power probe 434 (FIG. 4) is left in the lowered position and power is collected on a power strip (not shown), which transfers the charge to the power storage device 422, until the remote unit 402 indicates that the power source 422 has returned to a full state of charge.

Because both the remote unit 402 and the base unit 414 contain transceivers 410 and 418 respectively, the wireless monitoring system 400 is capable of bi-directional communications. Therefore, the base unit 414 may be configured to wirelessly transmit instructions to the remote unit 402. These instructions may be, but are not limited to, altering the data rate at which the sensors collect the operational data or other parameters associated with the operational data.

Figure 6:
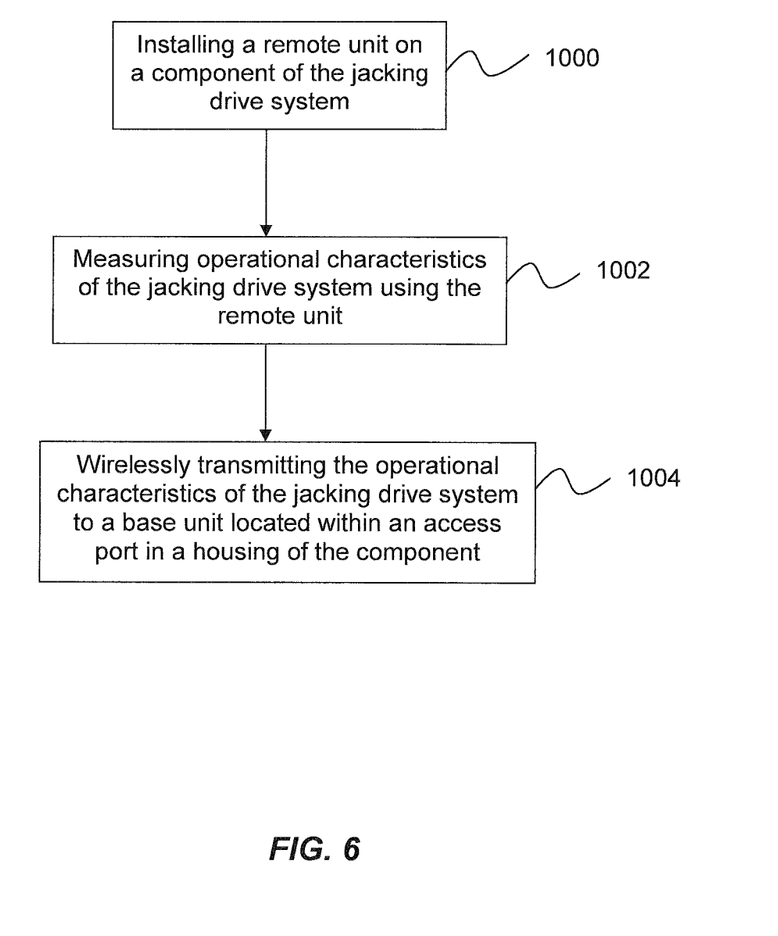
FIG. 6 is a flowchart of a method for measuring operational data of a jacking drive system using an integrated wireless data system in accordance with an aspect of the present disclosure.

FIG. 6 provides a method for measuring operating characteristics of a jacking drive system under real-world operating conditions. The method begins with the step of 1000 installing a remote unit 402 on a component of the jacking drive system 300 (e.g., the climbing pinion shaft 308 of the jacking drive system 300). The method continues with the step of 1002 measuring operational characteristics of the jacking drive system 300 using the remote unit 402. The method concludes with the step of 1004 wirelessly transmitting the operational characteristics of the jacking drive system 300 to a base unit 414 located within an access port 320 in a housing 312 of the component. Again, the base unit 414 may be connected to an alert system 432. The alert system 432 is configured to provide a warning to an operator under specific conditions, such as when a load in the support leg 106 exceeds a specified threshold. Operational data is collected under real-world operation conditions.

It will be recognized by one skilled in the art that the motor 302, brake 318 and gearboxes 304, 306 discussed herein can be of a variety of different configurations, and that the use of the continuous monitoring system 400 will function the same, regardless of the configuration of those components.

The foregoing disclosure has been illustrated and described in accordance with the relevant legal standards, it is not intended that these examples illustrate and describe all possible forms of the present disclosure, thus the description is exemplary rather than limiting in nature. Variations and modifications to the disclosed examples may become apparent to those skilled in the art and fall within the scope of the present disclosure. Additionally, the features and various implementing examples may be combined to form further examples of the present disclosure.

What is claimed is:

1. An integrated wireless data system for measuring load characteristics of a jacking drive system of a leg of an offshore drilling rig, comprising:
    a remote circuit mounted on a shaft of the jacking drive system having a circular cross-section with a circumference;
    said remote circuit having at least one sensor and a remote transceiver and an analog-to-digital converter (A/D) and a microprocessor and a plurality of antennae including a primary antenna and a secondary antenna, wherein each of the primary antenna and the secondary antenna coupled to said remote transceiver and extending outwardly from the circumference of the shaft at locations of the primary antenna and the secondary antenna opposite from one another for measuring operational data of the jacking drive system;
    said remote circuit including a power storage device connected to and providing power to said remote circuit;
    a base unit having a base transceiver and a microprocessor connected to and in communication with an alert system for alerting an operator; and
    said remote circuit and said base unit wirelessly communicating with one another to exchange the operational data in real-time and bi-directionally, wherein the shaft is disposed in a housing partially filled with oil and said locations of said primary antenna and said secondary antenna are 180 degrees opposite from one another for allowing at least one of said primary antenna and said secondary antenna to be above a surface of the oil for transmitting the operational data to said base unit regardless of a rotational position of the shaft.

2. The system of claim 1, wherein the shaft is a climbing pinion shaft of the jacking drive system.

3. The system of claim 2, wherein said at least one sensor includes a strain gauge mounted to the climbing pinion shaft and connected to said remote circuit, wherein said remote circuit is configured to measure a load on the climbing pinion shaft.

4. The system of claim 1, wherein said remote circuit further includes a switching mechanism for switching between said primary antenna and said secondary antenna.

5. The system of claim 1 wherein said base unit to send a signal to said remote circuit to alter parameters associated with the operational data.

6. The system of claim 1, wherein said base unit includes onboard storage to store the operational data for later analysis.

7. The system of claim 1, wherein said remote circuit is configured to transmit a state of charge of said power storage device and said base unit is disposed in an access port of the housing surrounding the shaft and is configured to detect the state of charge from said remote circuit.

8. The system of claim 7, further including a power probe configured to be lowered into the access port to transfer the power to said power storage device in response to said remote circuit indicating that the state of charge is low.

9. The system of claim 1, wherein said base unit is configured to wirelessly transmit instructions to said remote circuit to alter a data rate at which said at least one sensor collects the operational data.

10. The system of claim 1, wherein said at least one sensor is disposed along an arc length of the circumference of the shaft extending between the primary antenna and the secondary antenna.

11. The system of claim 1, wherein at least one of said primary antenna and said secondary antenna extends radially from the circumference of the shaft.

12. The system of claim 1, wherein said primary antenna and said secondary antenna are each coupled to said remote transceiver and attached to the circumference of the shaft at a proximal end and extending rectilinearly outwardly from the circumference of the shaft to a distal end.

13. A method for measuring operating characteristics of a jacking drive system of a leg of an offshore drilling rig under real-world operating conditions, comprising:
    installing a remote circuit on a shaft of the jacking drive system having a circular cross-section with a circumference and arranging a primary antenna and a secondary antenna of the remote circuit extending outwardly from the circumference of the shaft at locations of the primary antenna and the secondary antenna opposite from one another, wherein the shaft is disposed in a housing partially filled with oil and the locations of the primary antenna and the secondary antenna are 180 degrees opposite from one another for allowing at least one of the primary antenna and the secondary antenna to be above a surface of the oil;
    measuring operational characteristics of the jacking drive system using the remote circuit; and
    wirelessly transmitting the operational characteristics of the jacking drive system to a base unit located within an access port in the housing of the shaft.

14. The method of claim 13, wherein the shaft of the jacking drive system is a climbing pinion shaft.

15. The method of claim 13, further including switching between the primary antenna and the secondary antenna of the remote circuit with a switching mechanism and wherein said wirelessly transmitting the operational characteristics of the jacking drive system to the base unit located within the access port in the housing of the shaft is further defined as wirelessly transmitting the operational characteristics of the jacking drive system to the base unit located within the access port in the housing of the shaft regardless of a rotational position of the shaft.

16. The method of claim 13 further including:
    connecting the base unit of the jacking drive system to an alert system; and
    configuring the alert system to provide at least one of a visual and an audible alert when the operational characteristics falls outside a pre-defined range.

17. The method of claim 13, further including altering a data rate of the operational characteristics being measured by the remote circuit in response to the remote circuit receiving a signal from the base unit for altering the data rate.

* * * * *